United States Patent
Vittozzi

(10) Patent No.: US 8,282,237 B2
(45) Date of Patent: Oct. 9, 2012

(54) SIGNALLING OR EMERGENCY LIGHT-EMITTING DEVICE

(75) Inventor: Angelo Vittozzi, Rome (IT)

(73) Assignee: SOBEI S.r.l., Rome (IT)

( * ) Notice: Subject to any disclaimer, the term of this patent is extended or adjusted under 35 U.S.C. 154(b) by 380 days.

(21) Appl. No.: 12/733,830

(22) PCT Filed: Oct. 23, 2008

(86) PCT No.: PCT/IT2008/000661
§ 371 (c)(1),
(2), (4) Date: Mar. 23, 2010

(87) PCT Pub. No.: WO2009/057178
PCT Pub. Date: May 7, 2009

(65) Prior Publication Data
US 2010/0202136 A1  Aug. 12, 2010

(30) Foreign Application Priority Data
Oct. 29, 2007  (IT) .............................. RM2007A0567

(51) Int. Cl.
*F21L 4/00* (2006.01)
(52) U.S. Cl. ... 362/183; 362/185; 362/196; 362/249.02; 362/311.02; 362/267; 340/473; 340/815.45; 340/908
(58) Field of Classification Search .................. 362/183, 362/184, 185, 196, 249.02, 267, 311.02; 340/473, 815.45, 908
See application file for complete search history.

(56) References Cited

U.S. PATENT DOCUMENTS

| | | | |
|---|---|---|---|
| 1,933,965 A | 11/1933 | Carlson | |
| 6,549,121 B2* | 4/2003 | Povey et al. | 340/908 |
| 7,088,222 B1 | 8/2006 | Dueker et al. | |
| 7,497,593 B2* | 3/2009 | Wang | 362/249.02 |
| 2003/0025607 A1 | 2/2003 | Povey et al. | |
| 2006/0132323 A1* | 6/2006 | Grady, Jr. | 340/815.45 |

FOREIGN PATENT DOCUMENTS

| | | |
|---|---|---|
| WO | WO 2004/104953 | 12/2004 |
| WO | WO 2006/037075 | 4/2006 |

OTHER PUBLICATIONS

International Search Report for PCT/IT2008/000661, mailed Feb. 24, 2009.

\* cited by examiner

*Primary Examiner* — Stephen F Husar
(74) *Attorney, Agent, or Firm* — Nixon & Vanderhye P.C.

(57) ABSTRACT

A signaling or emergency light-emitting device comprises a shell (1) that is made of a watertight transparent material and is provided with a crush resistant structure, containing a LED illumination circuit which is provided with a battery (16) rechargeable through a coil (19) that can be linked in its magnetic flux with an inductive power source, with a microprocessor (22) and a radiofrequency transceiver (23). The shell (1) comprises a base (5) and a cover (6) that are joined together by means of a series of fixing screws (10), a seal (2) that extends radially and enlarges the rest surface for the base (5) is interposed peripherally between the base (5) and the cover (6).

9 Claims, 5 Drawing Sheets

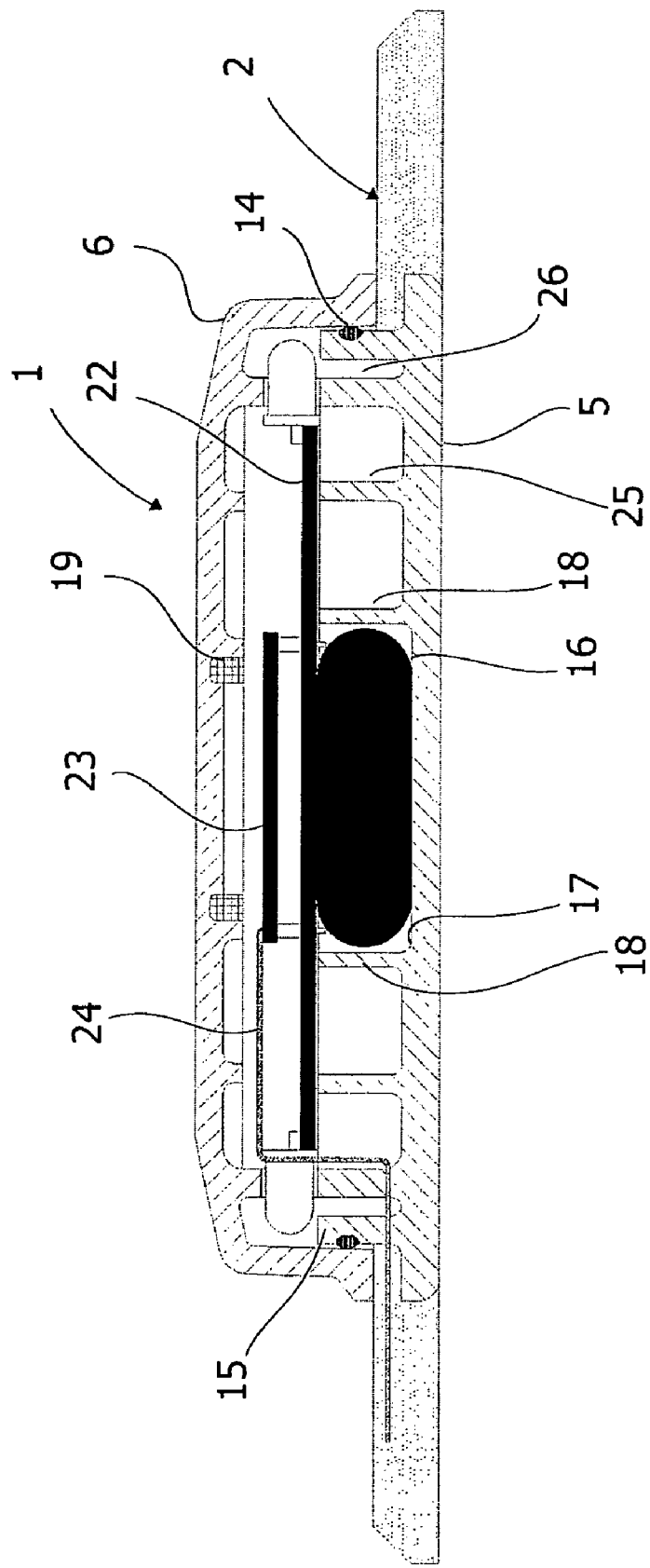

SIGNALLING OR EMERGENCY LIGHT-EMITTING DEVICE

This application is the U.S. national phase of International Application No. PCT/IT2008/000661 filed 23 Oct. 2008 which designated the U.S. and claims Priority to IT Patent Application No. RM2007A000567 filed 29 Oct. 2007, the entire contents of each of which are hereby incorporated by reference.

TECHNICAL FIELD

The present invention relates to a signalling or emergency light-emitting device.

BACKGROUND OF ART

U.S. Pat. No. 7,088,222 describes a device of this kind, comprising a puck-shaped shell of transparent material containing a LED (light emission diode) illumination circuit, which is provided with a battery rechargeable, among other, by means of an inductive power source, the circuit further comprising a microprocessor to control the operation thereof and a radiofrequency transceiver for the connection to other similar illumination apparatuses or other devices. In the device cited the shell of transparent material, which is waterproof and provided with a crush resistant structure, is surrounded by an external layer of opaque plastics having windows through which the light emitted by LED passes. Alternatively, the external layer, by which the shell, when it is made of two parts joined together, is sealed, can be also transparent, whereby windows are not required.

In a version of the device being described in the patent cited, it is provided with a ring to be connected to a support, for example a bicycle. Otherwise, the above described illumination device is commonly made to rest on a surface or also on the ground, alone or together with other similar devices, or also on water like a light buoy.

However, the structure of the device as described and depicted appears lacking of stability in its rest just for its puck shape.

Therefore, an object of this invention is to make a structure for a signalling or emergency light-emitting device that overcomes the above mentioned problems of stability in its rest.

DISCLOSURE OF THE INVENTION

The present invention provides a signalling or emergency light-emitting device, comprising a shell that is made of a watertight transparent material and is provided with a crush resistant structure, containing a LED (light emitting diode) illumination circuit which is provided with a battery rechargeable through a coil that can be linked in its magnetic flux with an inductive power source, the circuit further comprising a microprocessor and a radiofrequency transceiver, wherein the shell made of transparent material comprises a base and a cover that are joined together by means of a series of fixing screws, a seal that extends radially and enlarges the rest surface for the base, being interposed peripherally between the base and the cover.

Advantageously, the seal serves to protect an antenna of the radio frequency transceiver and reduces its loss resistance, increasing the antenna efficiency.

The present invention will be now described with reference to a preferred embodiment thereof, even if it is understood that constructive variations can be made without departing however from the scope of protection of the present invention and referring to the figures of the accompanying drawing.

BRIEF DESCRIPTION OF DRAWINGS

FIG. 7 shows a diagrammatic transversal cross-section taken along line B-B of the illumination device in FIG. 2.

BEST MODE FOR CARRYING OUT THE INVENTION

Figure 1:
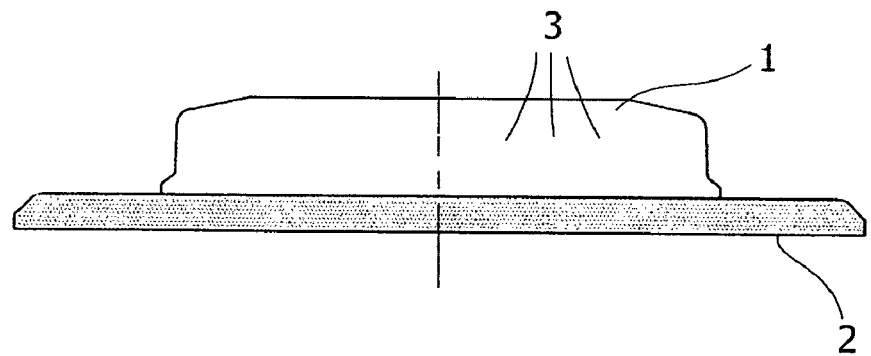
FIG. 1 shows a diagrammatic side view of the illumination device according to the present invention, a multiplicity of led being shown by phantom lines.
Figure 2:
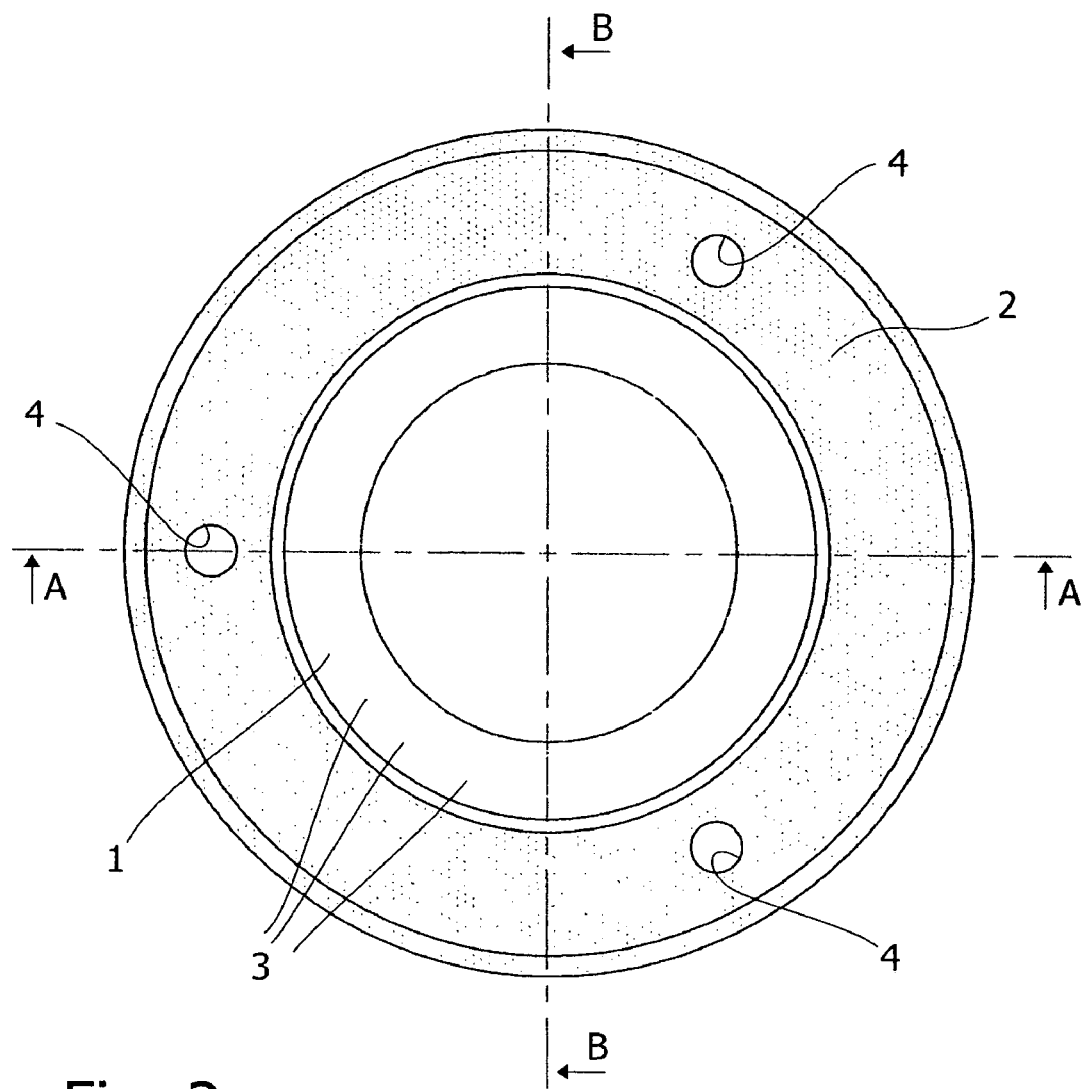
FIG. 2 shows a diagrammatic top plan view of the illumination device of FIG. 1, the multiplicity of led being shown by phantom lines.

Referring to the drawings, in FIGS. 1 and 2 there is diagrammatically shown a general aspect of the device, comprising a shell 1 and a seal 2 that is around the shell 1 and extends a rest surface thereof. Inside the shell 1 there is a multiplicity of light-emitting diodes or LEDs generally indicated as 3. LEDs 3 provide a laterally directed cone of light, which is emitted according to various known ways and thus not further described. The seal 2 is made generally of rubber, preferably of nitrile rubber. Holes 4 are provided in the seal 2 to receive and retain magnets (not shown) in order to improve the adhesion of the illumination device to metal surfaces such as car bodies.

Figure 3:
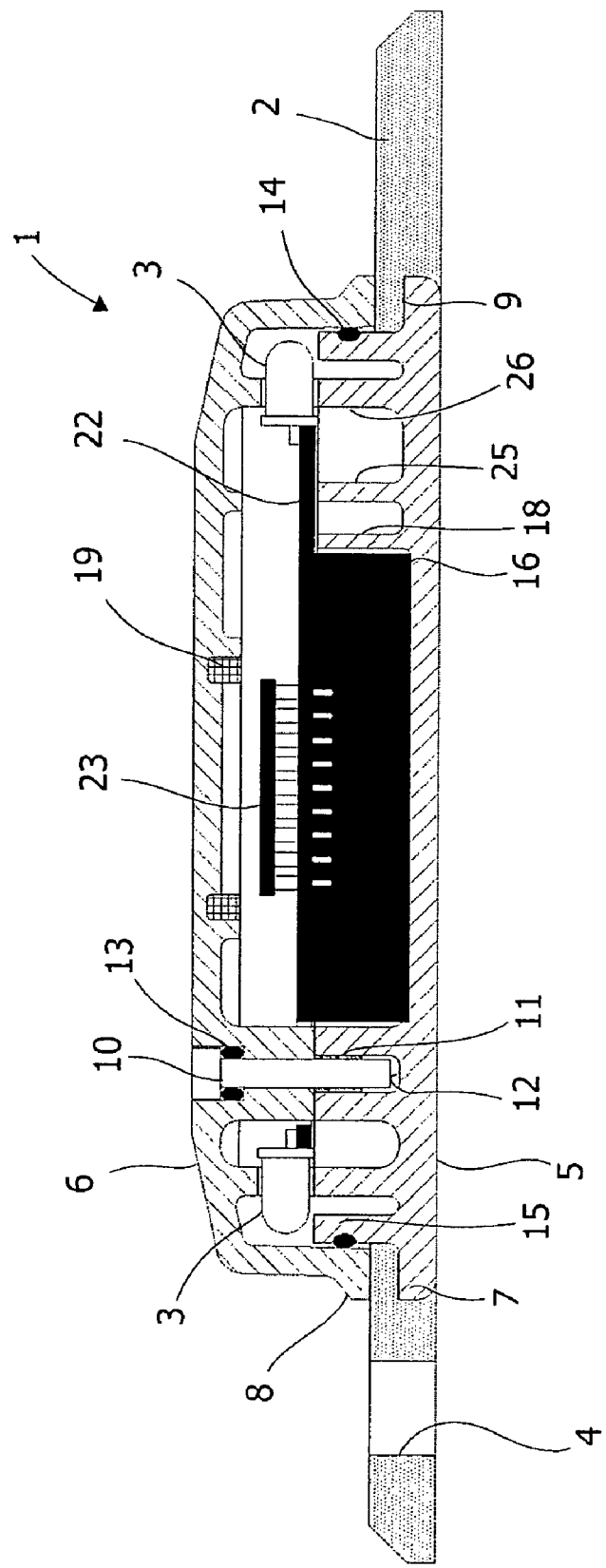
FIG. 3 shows a diagrammatic transversal cross-section according to line A-A of the illumination device in FIG. 2.

More in detail, with reference to FIG. 3, that shows a diagrammatic transversal cross-section according to line A-A of the illumination device in FIG. 2, the shell 1 is comprising of a base 5 and a cover 6. The base 5 and the cover 6 are depicted and described more in detail below with reference to FIGS. 5 and 6, which are plan views, from inside, of their structures.

The base 5 and the cover 6, which are preferably made of high transparency, great mechanical strength polycarbonate, are designed to rest on each other with the seal being interposed between them. In particular, the base 5 has a laterally projecting edge 7 that is opposite to a enlarged edge 8 of the cover 6. The seal 2 is shaped as a circular crown that is lightened by an undercut 9 in order that the edge 7 of the base 5 fits in the undercut 9.

The base 5 and the cover 6 are retained to each other by a set of screws 10, which pass through the cover 6 and are screwed in threaded inserts 11 that are fixed in respective blind holes 12 in the base 5. An "O-ring" 13 seals hermetically. The sealing of the inside of the shell 1 is obtained by means of the seal 2 and further improved by an "O-ring" 14 being housed in a receiving groove in a peripheral wall 15 of the base 5.

Figure 4:
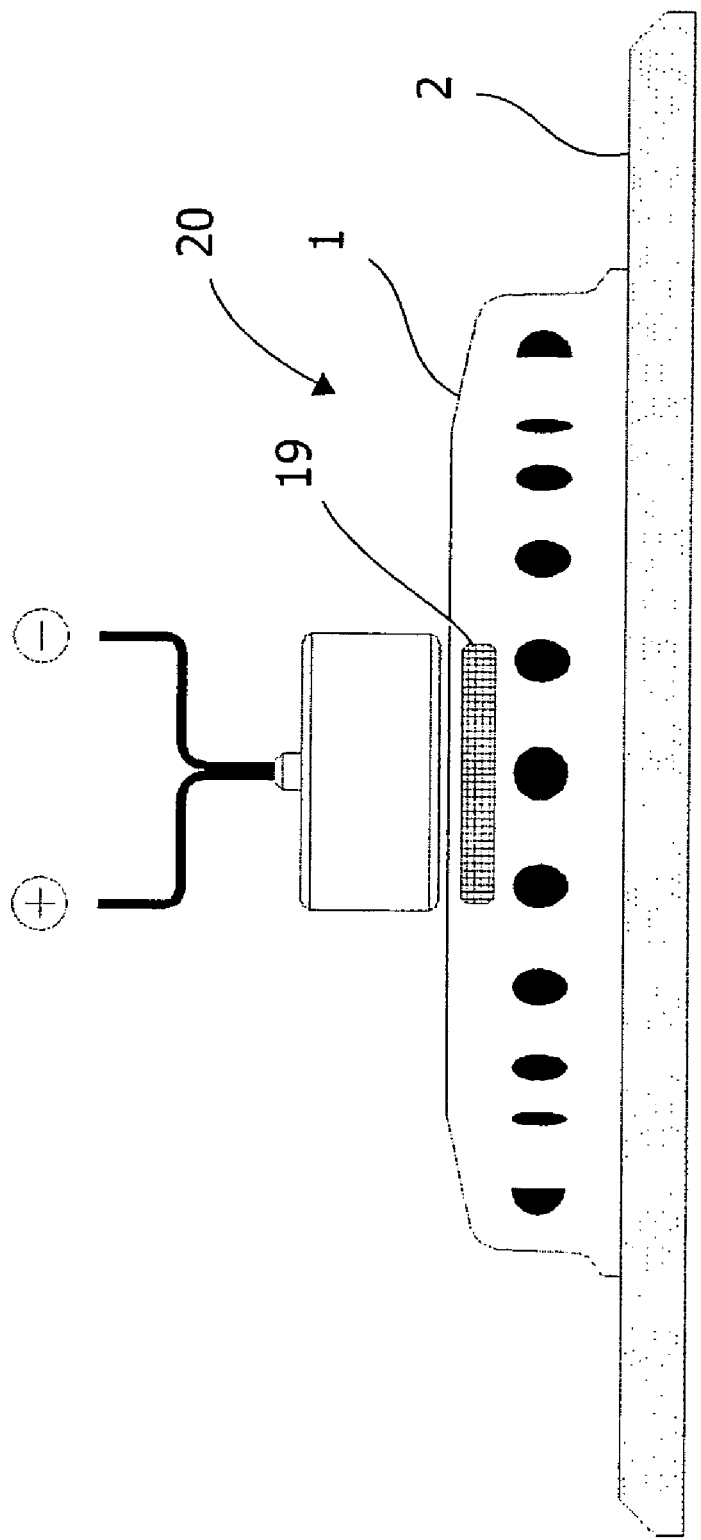
FIG. 4 shows a diagrammatic side view of the illumination device in FIG. 1 being connected to a recharging device, a coil being shown by phantom lines together with a multiplicity of LED.
Figure 6:
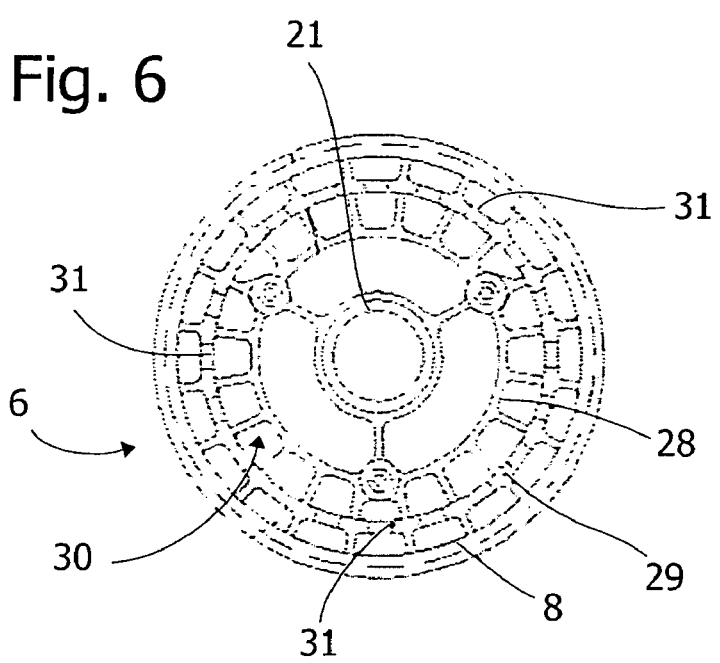

The shell 1 contains inside a LED illumination circuit as shown in its main parts in FIG. 3. The illumination circuit is provided with a rechargeable battery 16, which is housed in a square 17 defined by perimeter walls 18. The battery 16 is charged without contact through a coil 19 that is linked in its magnetic flux with an inductive power source that is diagrammatically depicted and generally indicated as 20 in FIG. 4, showing a diagrammatic side view of the illumination device in FIG. 1 associated with a battery recharging device. The coil 19 is housed in a circumferential groove 21 which is located on the internal side of the cover 6, as shown in FIG. 6. While not shown in the figures, the illumination circuit can be provided with a switch that requires no external command to operate the switch. Thus, the interior of the apparatus can be completely insulated, as it is not necessary to create a passage for electric contacts from inside to outside of the shell. A switch of the above mentioned type is for example a mercury switch that is controlled by a position given to the illumination device according to the invention.

Further, the illumination circuit comprises a microprocessor, which is schematically depicted in a printed circuit 22 and a radiofrequency transceiver 23. The printed circuit 22 and the ricetransceiver 23, besides in FIG. 3, are represented in more detail in FIG. 7 that shows a diagrammatic transversal cross-section taken along line B-B of the illumination device in FIG. 2. In particular, an antenna 24, as shown in FIG. 7, is connected to the transceiver 23 extending in through holes in the base 5 of the shell 1, in a radial direction inside the seal 2. With this arrangement, the antenna 24 is greatly protected and provided with a high efficiency and high directivity that reduces the influence of the ground effect. In fact, if the illumination device is positioned on the ground, the ground absorbs a certain amount of the emitted electromagnetic wave energy and the phenomenon increases with the frequency, proportionally reducing the transceiver range. Then, the seal 2, besides protecting mechanically the antenna, reduces the loss resistance thereof, in case by virtue of metal fragments embedded in the nitrile rubber.

Figure 5:
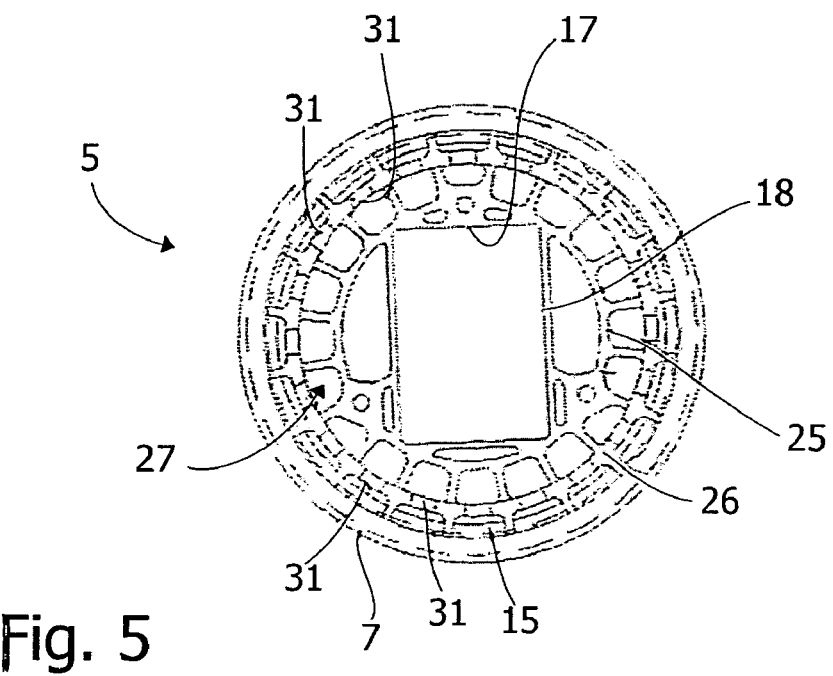
FIGS. 5 and 6 are plan view of an internal structure of a base and a cover, respectively, of the apparatus in FIG. 1.

LED 3 are arranged inside the shell 1 and their location will be clearer from a description of the internal structure of both the base 5 and the cover 6, which is made with reference to FIGS. 5 and 6, respectively.

If seen from its internal side, the base 5 (FIG. 5) integrally has, in central position, a rectangular square 17 for housing the battery, which is made by means of the perimeter walls 18. As shown also in FIGS. 3 and 7, the rectangular square 17 is inscribed in a first circumferential wall 25 that is surrounded in turn by a second circumferential wall 26 and by the above mentioned peripheral wall 15. Both the first and the second circumferential walls 25 and 26, and the peripheral wall 15 are joined together by radial ribs generally indicated as 27, which are shown only in FIG. 5.

The cover 6 (FIG. 6) has integrally in its internal side, in a central position thereof, the circumferential groove 21 to house the battery recharging coil 19. Coaxial to the circumferential groove 21 is a first circumferential ridge 28 that is surrounded by a second circumferential ridge 29 and the external wall ending with the thickened edge 8. The first circumferential ridge 28 and the second circumferential ridge 29 are joined together by radial ribs generally indicated as 30, which are shown only in FIG. 6.

By making walls in the base and the circumferential ridges respectively, the ones and the others being joined by the radial ribs, the structure of the base 5 as well as of the cover 6 is particularly strong so that the shell 1 can withstand the passage of also a very heavy vehicle passing over it, without undergoing cracks or deformations.

Provided likely spaced apart in the second circumferential wall 26 of the base 5 and in the second circumferential ridge 29 of the cover 6 in such a way that they match each other, are half-cylindrical notches that are generally indicated as 31 and are used for coaxially housing LED 3.

In order to increase the light reflection, the seal 2 can have an upper reflecting coating, which for example is made of a layer of paint or a refractive material.

It should be obvious that the above embodiment is given only in a non limiting way, and sizes and shape of the device, as well as materials which it is made of can be chosen in a various way without departing from the scope of the invention.

The invention claimed is:

1. A signalling or emergency light-emitting device, comprising a shell that is made of a watertight transparent material and is provided with a crush resistant structure, containing a LED (light emitting diode) illumination circuit which is provided with a battery rechargeable through a coil that can be linked in its magnetic flux with an inductive power source, the circuit further comprising a microprocessor and a radiofrequency transceiver, characterised in that the shell made of transparent material comprises a base and a cover that are joined together by means of a series of fixing screws, a seal that extends radially and enlarges the rest surface for the base, being interposed peripherally between the base and the cover.

2. The device according to claim 1, characterised in that said transceiver has an antenna that exit the base to fit radially in the seal.

3. The device according to claim 1, characterised in that the base and the cover are made of high transparency, great mechanical strength polycarbonate.

4. The device according to claim 1, characterised in that the seal is made of nitrile rubber.

5. The device according to claim 4, characterised in that the seal has holes for housing magnets, and the magnets themselves.

6. The device according to claim 1, characterised in that the base integrally has internally, in central position, a rectangular square for housing the battery, which is inscribed in a first circumferential wall that is surrounded by a second circumferential wall and a third peripheral wall being joined together by radial ribs, half-cylindrical notches for coaxially housing LED being provided in the second circumferential wall, the third peripheral wall having externally a groove for housing an "O-ring".

7. The device according to claim 1, characterised in that the cover has integrally in its internal side, in a central position thereof, a circumferential groove to house the battery recharging coil, coaxially to said circumferential groove there is a first circumferential ridge that is surrounded by a second circumferential ridge and the external wall being joined together by radial ribs, half-cylindrical notches, for housing LED in connection with the half-cylindrical of the second circumferential wall of the base, being provided on the second circumferential ridge.

8. The device according to claim 1, characterised in that the base and the cover have peripherally projecting edges and the seal has an undercut for fitting an edge of the base therein.

9. The device according to claim 1, characterised in that the seal has an upper refractive coating.

* * * * *